US010988585B2

(12) United States Patent
Nishiyama et al.

(10) Patent No.: US 10,988,585 B2
(45) Date of Patent: Apr. 27, 2021

(54) RESIN SHEET AND CURED PRODUCT OF RESIN SHEET

(71) Applicant: HITACHI CHEMICAL COMPANY, LTD., Tokyo (JP)

(72) Inventors: Tomoo Nishiyama, Tokyo (JP); Yoshitaka Takezawa, Tokyo (JP); Hideyuki Katagi, Tokyo (JP); Kazuya Kiguchi, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 353 days.

(21) Appl. No.: 16/079,739

(22) PCT Filed: Aug. 25, 2016

(86) PCT No.: PCT/JP2016/074881

§ 371 (c)(1),
(2) Date: Aug. 24, 2018

(87) PCT Pub. No.: WO2017/145412

PCT Pub. Date: Aug. 31, 2017

(65) Prior Publication Data

US 2020/0223994 A1 Jul. 16, 2020

(30) Foreign Application Priority Data

Feb. 25, 2016 (JP) ............................ JP2016-034889

(51) Int. Cl.
*C08J 5/18* (2006.01)
*C08G 59/14* (2006.01)
(Continued)

(52) U.S. Cl.
CPC ............ *C08J 5/18* (2013.01); *C08G 59/1438* (2013.01); *C08G 59/24* (2013.01); *C08G 59/42* (2013.01);
(Continued)

(58) Field of Classification Search
CPC .............. C08K 3/00; C08K 2003/2227; C08K 2003/385; C08K 3/22; C08K 3/38;
(Continued)

(56) References Cited

U.S. PATENT DOCUMENTS

2004/0147709 A1 7/2004 Akatsuka et al.
2012/0251830 A1 10/2012 Nishiyama et al.

FOREIGN PATENT DOCUMENTS

CN 104024332 A 9/2014
JP 4118691 B2 7/2008
(Continued)

OTHER PUBLICATIONS

"Transfer Molding Composite Using Reaction-Induced Smectic Type Mesogen Epoxy Resin" Hitachi Chemical Co., Ltd. Kenji Tanaka, Yuka Yoshida, Shinichi Kosugi, Hideyuki Katagi, Haruaki Sue, Yoshitaka Takezawa.
(Continued)

*Primary Examiner* — Lawrence D Ferguson
(74) *Attorney, Agent, or Firm* — Fitch, Even, Tabin & Flannery, LLP

(57) ABSTRACT

A resin sheet includes an epoxy resin including an epoxy resin oligomer and an epoxy resin monomer; a curing agent; and an inorganic filler, wherein a content of the inorganic filler is more than 30% by volume but less than 80% by volume.

10 Claims, 3 Drawing Sheets

(51) Int. Cl.
*C08G 59/24* (2006.01)
*C08G 59/42* (2006.01)
*C08K 3/22* (2006.01)
*C08K 3/38* (2006.01)

(52) U.S. Cl.
CPC .................. *C08K 3/22* (2013.01); *C08K 3/38* (2013.01); *C08J 2363/00* (2013.01); *C08K 2003/2227* (2013.01); *C08K 2003/385* (2013.01)

(58) Field of Classification Search
CPC ......... C08L 63/00; C08L 61/12; C08G 59/14; C08G 59/1438; C08G 59/20; C08G 59/24; C08G 59/42; C08J 2363/00; C08J 5/18
See application file for complete search history.

(56) References Cited

FOREIGN PATENT DOCUMENTS

| | | | |
|---|---|---|---|
| JP | 2013-151655 | A | 8/2013 |
| JP | 2013-227451 | A | 11/2013 |
| JP | 2013-234313 | A | 11/2013 |
| JP | 5397476 | B2 | 1/2014 |
| JP | 2015-74750 | A | 4/2015 |
| JP | 2016-113540 | A | 6/2016 |
| TW | 201333089 | A | 8/2013 |
| WO | 2009/110424 | A1 | 9/2009 |
| WO | 2010/116891 | A1 | 10/2010 |
| WO | 2016/98709 | A1 | 6/2016 |
| WO | 2016/104772 | A1 | 6/2016 |
| WO | 2016/104788 | A1 | 6/2016 |

OTHER PUBLICATIONS

The 64th Symposium on Macromolecules S22. "Recent Developments in Synthesis of Networked Polymers and Their Novel Properties and Functions", Sep. 17, 2015, Hitachi Chemical Co., Ltd. Kenji Tanaka, Yuka Yoshida, Shinichi Kosugi, Hideyuki Katagi, Haruaki Sue, Yoshitaka Takezawa.

"Behavior of High-Order Structure Formation of Reaction-Induced Smectic Type Mesogen Epoxy Resin" Hitachi Chemical Co., Ltd. 1, and Hitachi, Ltd.2 Yuka Yoshida, Kenji Tanaka, Hideyuki Katagi, Yoshihiro Amano, Yoshitaka Takezawa, and Shingo Tanaka.

The 65th Symposium on Networked Polymer, "Behavior of High-Order Structure Formation of Reaction-Induced Smectic Type Mesogen Epoxy Resin", Hitachi Chemical Co., Ltd. Yuka Yoshida, Kenji Tanaka, Hideyuki Katagi, Yoshihiro Amano, Yoshitaka Takezawa, Hitachi, Ltd. Shingo Tanaka.

RESIN SHEET AND CURED PRODUCT OF RESIN SHEET

CROSS-REFERENCE TO RELATED APPLICATIONS

This application is a U.S. national phase application filed under 35 U.S.C. § 371 of International Application No. PCT/JP2016/074881, filed Aug. 25, 2016, which claims priority from Japanese Patent Application No. 2016-034889, filed Feb. 25, 2016, designating the United States, which are hereby incorporated herein by reference in their entirety.

TECHNICAL FIELD

The present disclosure relates to an epoxy resin, an epoxy resin composition, an inorganic filler-containing epoxy resin composition, a resin sheet, a cured product, and an epoxy compound.

BACKGROUND ART

Recently, semiconductor package devices are required to have provisions for heat dissipation since the temperature surrounding the chip tends to be easily increased due to increases in density and integration. Silicon carbide (SiC), which enables greater increase in output, has been actively studied to be applied, instead of silicon, particularly in the field of power devices for use in electric cars, hybrid cars, industrial equipment, and the like, and peripheral materials having high heat conductivity and insulation properties have been demanded. Such peripheral materials are also needed to have high insulation properties, depending on the section to which the material is applied.

As the peripheral material arranged in the surroundings of a power device, organic materials have been increasingly used, in accordance with the trend of decreases in size and weight of the power device, instead of inorganic materials such as ceramics which have been heretofore used. Examples of the form of the organic materials to be used include a composite material made of a mixture of an organic polymer (resin) and an inorganic filler.

Organic materials have a problem of being low in heat conductivity while having many advantages such as high material processability and weight-reducing ability, as compared with inorganic materials. The typical heat curable resin has a heat conductivity of about 0.2 W/(m·K) to 0.30.2 W/(m·K).

As a technique for increasing heat conductivity, a technique in which an inorganic filler typified by alumina or boron nitride having a high heat conductivity is used, is known (see, for example, Japanese Patent No. 4889110). A technique is also known in which an increase in heat conductivity is achieved by introducing a rigid structure such as a mesogen backbone into the molecule of a resin, thereby allowing the resin to exhibit liquid crystallinity or crystallinity by use of intermolecular stacking characteristics and to be suppressed in phonon scattering (see, for example, Japanese Patent Nos. 4118691 and 5397476). While the former technique can increase the heat conductivity of a composite material due to an increase in the amount of filling, the maximum amount of filling is limited from the viewpoint that insulation properties are simultaneously satisfied. In contrast, the latter technique in which a resin with high heat conductivity is used allows for dramatic increase in the heat conductivity of a composite material.

However, resins having a high heat conductivity usually have a high melting point, and thus have a problem of being poor in handling property. Accordingly, a technique in which a resin having a compatibility with a high heat-conductive crystalline resin is blended to reduce the crystallinity, and to improve fluidity and insulation properties of the resin, is known. However, in this technique, the stacking properties of the high heat-conductive resin after curing may be impaired, which may results in a failure to provide a high heat conductivity to the resulting composite material.

Meanwhile, in order to improve the insulation properties of a resin sheet formed from an organic material, it is effective to increase the thickness of the resin sheet. However, in the case of producing a resin sheet by a method in which a liquid raw material obtained by dissolving a resin in an organic solvent is coated on a substrate, using a comma coater or the like, the thickness per one layer of resin sheet is about 120 μm at maximum. This is because an increase in the thickness of coating makes the organic solvent more difficult to be volatilized from a coating surface, and thus the remaining organic solvent may expand by heat during curing, resulting in the formation of voids. Accordingly, in the case of using an organic solvent, a technique is generally used in which resin sheets each having a thickness of about 80 μm are disposed one on another in layers and pressed to be formed into a single layer, so as to increase the thickness of the resulting resin sheet. However, when plural resin sheets are layered, the heat conductivity may be decreased due to the generation of interfaces between the layered resin sheets. Further, complete removal of the remaining organic solvent by merely applying heat seems to be difficult, in view of securing the fluidity of the resin, controlling the degree of cure thereof, and preventing the formation of voids.

PRIOR ART DOCUMENTS

Patent Documents

Patent Document 1: Japanese Patent Application Laid-Open (JP-A) No. 2007-516315

Patent Document 2: Japanese Patent Application Laid-Open (JP-A) No. 2014-514413

SUMMARY OF INVENTION

Technical Problem

In view of the above circumstances, the present invention aims to provide a resin sheet having an excellent moldability without any solvent or with a low amount of solvent, and an excellent heat conductivity and insulation properties after curing, as well as to provide a cured product of the resin sheet.

Solution to Problem

The means for solving the problems include the following embodiments.

<1> A resin sheet including:

an epoxy resin including an epoxy resin oligomer and an epoxy resin monomer;

a curing agent; and an inorganic filler, wherein a content of the inorganic filler is more than 30% by volume but less than 80% by volume.

<2> The resin sheet according to <1>, wherein the epoxy resin oligomer includes a reaction product of an epoxy resin monomer having a mesogen skeleton, with a divalent phenolic compound having a structure in which two hydroxyl groups are bound to are bound to one benzene ring.

<3> The resin sheet according to <1> or <2>, wherein the epoxy resin oligomer includes a reaction product of a compound represented by the following Formula (1), with a divalent phenolic compound having a structure in which two hydroxyl groups are bound to on one benzene ring.

(1)

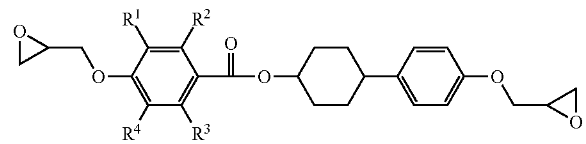

In Formula (1), each of $R^1$ to $R^4$ independently represents a hydrogen atom or an alkyl group having from 1 to 3 carbon atoms.

<4> The resin sheet according to <2> or <3>, wherein the divalent phenolic compound includes hydroquinone.

<5> The resin sheet according to any one of <1> to <4>, wherein the epoxy resin monomer includes a compound including a mesogen skeleton and two epoxy groups in a molecule thereof.

<6> The resin sheet according to any one of <1> to <5>, wherein the epoxy resin monomer includes at least one selected from the group consisting of a compound represented by the following Formula (1) and a biphenyl-type epoxy resin monomer.

(1)

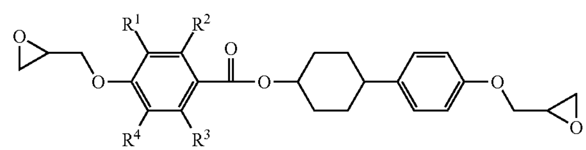

In Formula (1), each of $R^1$ to $R^4$ independently represents a hydrogen atom or an alkyl group having from 1 to 3 carbon atoms.

<7> The resin sheet according to any one of <1> to <6>, wherein the curing agent includes a dihydroxybenzene novolac resin.

<8> The resin sheet according to any one of <1> to <7>, wherein the epoxy resin oligomer has a number average molecular weight of from 600 to 2,300.

<9> The resin sheet according to any one of <1> to <8>, wherein the resin sheet has an average thickness of from 0.2 mm to 3 mm.

<10> A cured product of a resin sheet, which is a cured product of the resin sheet according to any one of <1> to <9>.

<11> The cured product of the resin sheet according to <10>, having a diffraction peak in a diffraction angle 2θ range of from 3.0° to 3.5° according to an X-ray diffraction method using CuKα radiation.

Advantageous Effects of Invention

According to the invention, a resin sheet having an excellent moldability without any solvent or with a low amount of solvent, and an excellent heat conductivity and insulation properties after curing, as well as a cured product of the resin sheet are provided.

DESCRIPTION OF EMBODIMENTS

Figure 1:
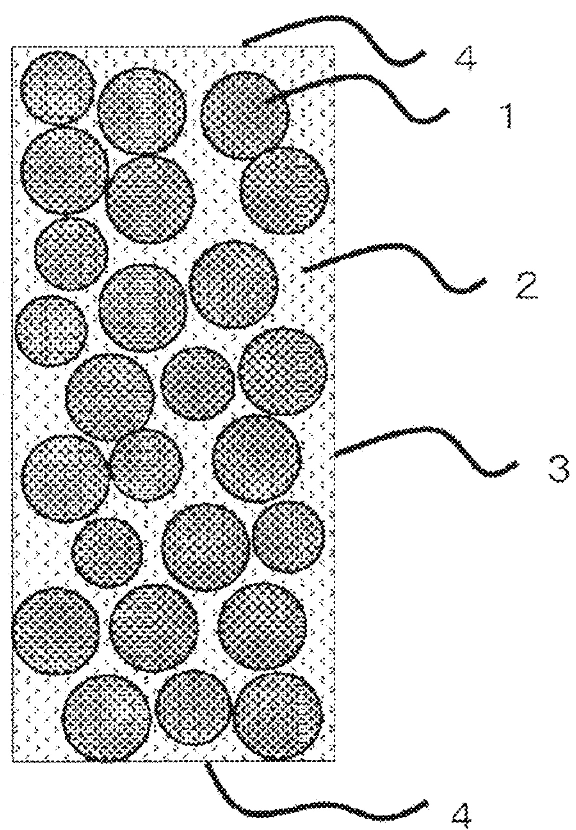
FIG. 1 is a schematic diagram showing an example of a cross-sectional view of a cured product of a resin sheet according to an embodiment of the present invention.

Hereinafter, embodiments of the invention is described. However, the invention is not limited to these embodiments. In the embodiments below, the components (including element steps and the like) are not always indispensable unless otherwise expressly provided. The same applies to numerical values and their ranges, and the invention is not limited thereby.

The term "step" as used herein includes not only a separate step but also a step that is not clearly distinguished from other steps as long as the desired effect of the step is obtained therefrom.

Any numerical value range indicated by the term "to" represents any range including the numerical values described before and after the term "to" as the minimum value and the maximum value, respectively.

The upper limit or the lower limit described in one numerical value range stepwisely described herein may be replaced with the upper limit or the lower limit described in another numerical value range stepwisely described herein, respectively. The upper limit or the lower limit of any numerical value range described herein may also be replaced with that described in Examples.

When plural substances are present in each component of a composition, the content of such a component in the composition means the total amount of the plurality of substances present in the composition, unless especially noted.

The term "layer" as used herein includes not only a structure configured to cover an entire surface but also a structure configured to cover a part of a surface when observed in planer view.

<Resin Sheet>

The resin sheet according to an embodiment of the present invention contains: an epoxy resin containing an epoxy resin oligomer and an epoxy resin monomer; a curing agent; and an inorganic filler, in which the content of the inorganic filler is more than 30% by volume but less than 80% by volume.

As a result of investigation, the present inventors have found out that the resin sheet having the above described constitution has an excellent moldability without any solvent or with a low amount of solvent, as a result of which a thick resin sheet can be formed. The thickness of the resin sheet is not particularly limited. For example, the thickness of the resin sheet can be increased up to an average thickness of 3 mm. The resin sheet preferably has an average thickness of from 0.2 mm to 3 mm. In addition, a cured product of the resin sheet obtained by curing the resin sheet has been found to have an excellent heat conductivity and insulation properties. The "average thickness of a resin sheet" as used herein refers to a thickness of a single layer (not the thickness of a laminated body composed of plural resin layers). The average thickness refers to a number average value obtained by averaging the thicknesses measured at nine points.

The reason why the resin sheet according to an embodiment of the present invention has an excellent moldability without any solvent or with a low amount of solvent is not clear. However, it is presumably due to that, when an epoxy resin contains an epoxy resin oligomer as a resin component, the elongation of the epoxy resin in a semi-cured state is increased as compared to the case in which the epoxy resin contains no oligomer, as a result of which the moldability of the resin is improved. It is also presumably due to that the resin is in a state in which the reaction of functional groups has already proceeded to some point because of the inclusion of the oligomer, and thus generation of heat during curing can be suppressed. Further, an increase in the thickness of the resin sheet provides cushioning characteristics even in a case in which a high amount of inorganic filler is contained, which may result in the resin sheet having an excellent moldability.

The resin sheet according to an embodiment of the present invention can be prepared without any solvent or with a low amount of solvent. Therefore, the amount of solvent remaining unvolatilized in the resin sheet can be reduced, for example, to 0.1% by mass or less. As a result of which the generation of voids due to the remaining organic solvent is effectively prevented, and the insulation properties tend to be further improved.

FIG. 1 is a schematic diagram showing an example of a cross-sectional view of a cured product of a resin sheet according to an embodiment of the present invention. As shown in FIG. 1, a resin sheet 3 has a structure in which a boron nitride filler 1 is dispersed in a resin matrix 2 (a mixed phase of a cured product of an epoxy resin and an alumina filler). Reference numeral 4 indicates a surface of the resin sheet.

Figure 2:
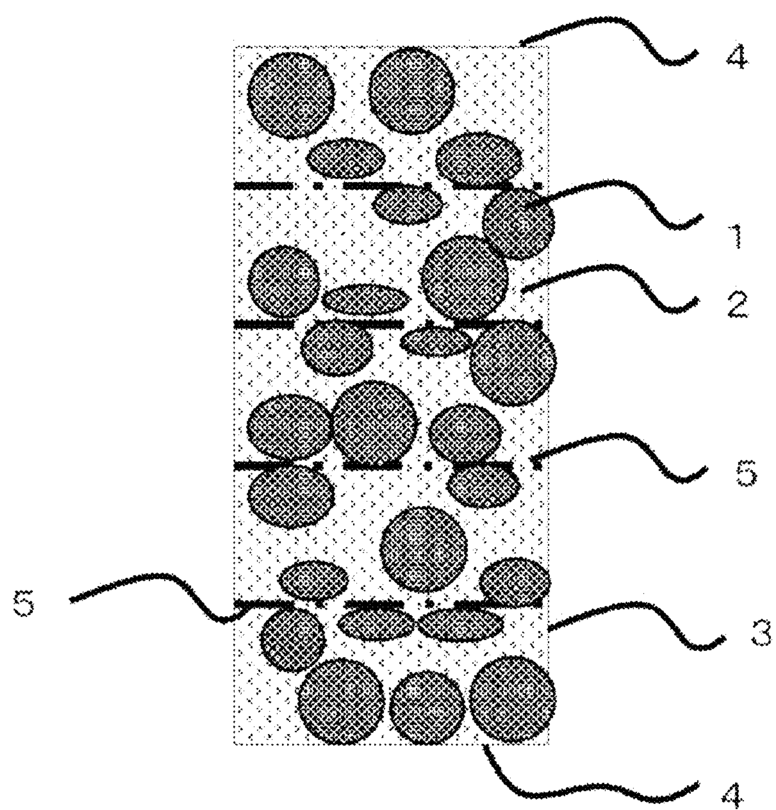
FIG. 2 is a schematic diagram showing an example of a cross section of a cured product of a resin sheet obtained by layering plural layers.

FIG. 2 is a schematic diagram showing an example of a cross section of a cured product of a resin sheet obtained by layering plural layers. Similar to FIG. 1, each resin sheet 3 has a structure in which boron nitride fillers 1 is dispersed in a resin matrix 2 (a mixed phase of the cured product of an epoxy resin and an alumina filler). Further, an interface 5 is formed between plural resin sheets 3. In the vicinity of the interface 5 between the resin sheets, the boron nitride filer 1 is oriented toward a direction vertical to a thickness direction of the resin sheets 3, which may interfere with the conduction of heat.

Figure 3:
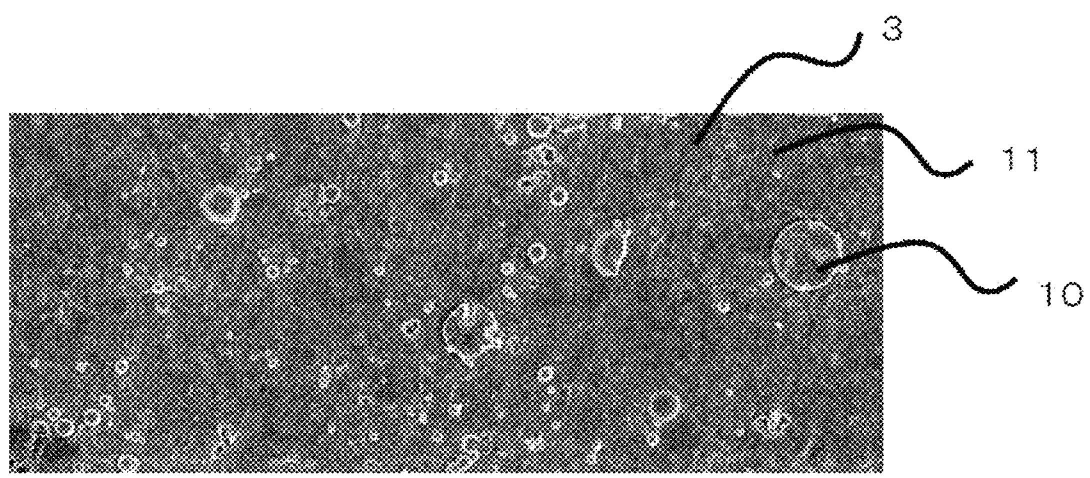
FIG. 3 shows an example of a scanning electron microscope (SEM) photograph of a cross section of a cured product of a resin sheet according to an embodiment of the present invention.

FIG. 3 shows an example of a scanning electron microscope (SEM) photograph of a cross section of a cured product of a resin sheet according to an embodiment of the present invention. Similar to FIG. 1, the resin sheet 3 has a structure in which a boron nitride filler 10 is dispersed in a resin matrix 11.

Figure 4:
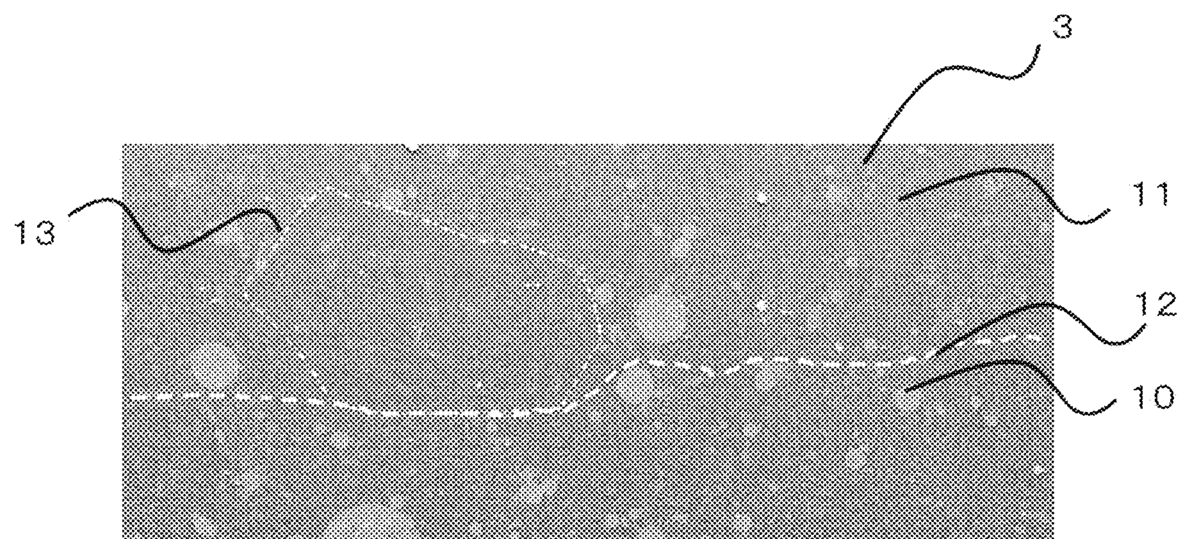
FIG. 4 shows an example of an SEM photograph of a cross section of a cured product of a resin sheet obtained by layering plural layers.

FIG. 4 shows an example of an SEM photograph of a cross section of a cured product of a resin sheet obtained by layering plural layers. The resin sheet 3 has a structure in which an alumina filler 10 and a boron nitride filler 13 are dispersed in a resin matrix 12. Further, an interface 12 is formed between plural resin sheets 3. Along the interface, a particle of the boron nitride filler is pressed and deformed.

Epoxy Resin

The resin sheet according to an embodiment of the present invention includes an epoxy resin including an epoxy resin oligomer and an epoxy resin monomer. The "epoxy resin oligomer" as used herein refers to a compound that is a multimer (including a dimer) of an epoxy resin monomer, that contains unreacted epoxy groups, and that has a molecular weight as measured by GPC of from 600 to 6,000.

The epoxy resin contained in the resin sheet may contain, in addition to the epoxy resin oligomer and the epoxy resin monomer, a compound that is a polymer of the epoxy resin monomers, that contains an unreacted epoxy group, and that has a molecular weight as measured by gel permeation chromatography (GPC) of more than 6,000.

The content of the epoxy resin (the total content of the epoxy resin oligomer, the epoxy resin monomer, and other epoxy resin(s)) in the resin sheet is not particularly limited. For example, the content of the epoxy resin is preferably from 2% by mass to 38% by mass, and more preferably from 4% by mass to 28% by mass with respect to the total mass of the resin sheet.

The content of the epoxy resin oligomer in the epoxy resin is not particularly limited. For example, the content of the epoxy resin oligomer is preferably from 3% by mass to 50% by mass, and more preferably from 5% by mass to 45% by mass with respect to the total mass of epoxy resin. The content of the epoxy resin oligomer in the epoxy resin can be determined, for example, in terms of area ratio using GPC.

The content of the epoxy resin monomer in the epoxy resin is not particularly limited. For example, the content of epoxy resin monomer is preferably from 30% by mass to 97% by mass, and more preferably from 35% by mass to 95% by mass with respect to the total mass of epoxy resin. The content of the epoxy resin monomer in the epoxy resin can be determined, for example, in terms of area ratio using GPC.

In view of heat conductivity, the resin sheet according to an embodiment of the present invention preferably contains an epoxy resin having a mesogen skeleton, as the epoxy resin. The "mesogen skeleton" as used herein refers to a molecular structure which allows crystallinity or liquid crystallinity to be easily exhibited. Specific examples thereof include a biphenyl skeleton, a phenylbenzoate skeleton, an azobenzene skeleton, a stilbene skeleton, a cyclohexylbenzene skeleton, and derivatives thereof.

When the epoxy resin having a mesogen skeleton in the molecular structure thereof is cured to form a resin matrix, a higher-order structure is easily formed, and a cured product formed therefrom tends to have a higher heat conductivity. The "higher-order structure" as used herein means a state in which constituent components are regularly aligned, and examples of such a structure include a crystal phase and a liquid crystal phase. Existence of such a higher-order structure can be easily determined by observation under a polarizing microscope. That is, existence of a higher-order structure (also referred to as a "periodic structure") can be determined in a case in which an interference pattern due to depolarization is observed in a crossed nicols. Alternatively, existence of a crystal structure or a liquid crystal structure can be indirectly confirmed by measuring a storage elastic modulus change according to a temperature change, since the storage elastic modulus change according to a temperature change decreases upon existence of such a crystal structure or a liquid crystal structure.

Example of the higher-order structure having a high regularity derived from a mesogen structure and include a nematic structure and a smectic structure. The nematic structure is a liquid crystal structure in which the major axes of the molecules are oriented in uniform direction and has only orientational order. The smectic structure is a liquid crystal structure having one dimensional position order in addition to the orientational order, so as to have a layer structure with a constant period. In the same layer among the periodic structure of the smectic structure, the periodic direction of the layer structure is uniform. That is, the orderliness of molecules is higher in the smectic structure than in the nematic structure. In a case in which a highly ordered periodic structure is formed within the resin matrix, the scattering of phonons, which mediates heat conductivity, can be prevented. Therefore, the smectic structure tends to exhibit a higher heat conductivity as compared to the nematic structure.

The presence or absence of a smectic structure in the periodic structure in the resin matrix can be determined by the method described in Examples.

The content of the epoxy resin having a mesogen skeleton in the epoxy resin is not particularly limited. For example, the content of the epoxy resin having a mesogen skeleton is preferably 30% by mass or more, more preferably 50% by mass or more, and still more preferably 70% by mass or more, with respect to the total mass of the epoxy resin. The content of the epoxy resin having a mesogen skeleton in the epoxy resin can be determined, for example, by dissolving the epoxy resin and a curing agent in an organic solvent, removing the inorganic filler contained therein, then performing separation using a GPC column, and carrying out measurements by a combination of measurement methods, such as nuclear magnetic resonance, infrared spectroscopy, time-of-flight mass spectrometry, or gas mass spectrometry.

(1) Epoxy Resin Oligomer

The resin sheet according to an embodiment of the present invention contains an epoxy resin oligomer as the epoxy resin. The epoxy resin oligomer may be used singly, or in combination of two or more kinds thereof.

The number average molecular weight of the epoxy resin oligomer is not particularly limited. For example, the epoxy resin oligomer preferably has a number average molecular weight as measured by gel permeation chromatography (GPC) of from 600 to 2,300, and more preferably from 650 to 2,200.

In view of heat conductivity and insulation properties, the epoxy resin oligomer is preferably a multimer of an epoxy resin monomer having a mesogen skeleton. In a case in which the epoxy resin oligomer is a multimer of an epoxy resin monomer having a mesogen skeleton, specific examples of the epoxy resin monomer having a mesogen skeleton include a biphenyl-type epoxy resin monomer such as YL6121H (manufactured by Mitsubishi Chemical Corporation). Specific examples thereof further includes tricyclic epoxy resin monomers such as an epoxy resin monomer having a terphenyl skeleton, 1-(3-methyl-4-oxiranylmethoxyphenyl)-4-(4-oxiranylmethoxyphenyl)-1-cyclohexene, 1-(3-methyl-4-oxiranylmethoxyphenyl)-4-(4-oxiranylmethoxyphenyl)-benzene (manufactured by Sumitomo Chemical Co., Ltd.), and trans-4-{4-(2,3-epoxypropoxy) phenyl}cyclohexyl=4-(2,3-epoxypropoxy)benzoate (manufactured by Sumitomo Chemical Co., Ltd).

The epoxy resin oligomer is preferably a multimer of an epoxy resin monomer represented by the following Formula (1), from the viewpoint of effectively forming the smectic structure in the resin matrix after curing, and achieving a high heat conductivity. The monomers represented by the following Formula (1) may be used singly, or in combination of two or more kinds thereof.

(1)

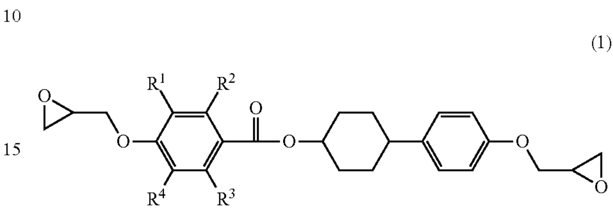

In Formula (1), each of $R^1$ to $R^4$ independently represents a hydrogen atom or an alkyl group having from 1 to 3 carbon atoms. Each of $R^1$ to $R^4$ independently represents preferably a hydrogen atom or an alkyl group having from 1 to 2 carbon atoms, more preferably a hydrogen atom or a methyl group, and still more preferably a hydrogen atom. Further, among the substituents represented by $R^1$ to $R^4$, it is preferable that two to four thereof are hydrogen atoms, more preferable that three or four thereof are hydrogen atoms, and still more preferable that all four of them are hydrogen atoms. In a case in which any of $R^1$ to $R^4$ represents an alkyl group having from 1 to 3 carbon atoms, it is preferable that at least one of $R^1$ or $R^4$ represents an alkyl group having from 1 to 3 carbon atoms.

The epoxy resin monomer represented by Formula (1) is preferably 4-{4-(2,3-epoxypropoxy)phenyl}cyclohexyl=4-(2,3-epoxypropoxy)benzoate in which all of $R^1$ to $R^4$ are hydrogen atoms, and more preferably trans-4-{4-(2,3-epoxypropoxy)phenyl}cyclohexyl=4-(2,3-epoxypropoxy)benzoate.

The epoxy resin oligomer is preferably a reaction product of the epoxy resin monomer having a mesogen skeleton, with a compound (hereinafter, also referred to as a "specific divalent phenolic compound") having a structure in which two hydroxyl groups are bound to one benzene ring.

In a case in which the epoxy resin oligomer is a reaction product of the epoxy resin monomer with the specific divalent phenolic compound, the molecular weight, the heat conductivity, and the glass transition temperature (Tg) of the epoxy resin oligomer tend to be easily controlled when synthesizing the epoxy resin oligomer. Further, in a case in which the specific divalent phenolic compound is used in the reaction, the reaction can be more easily controlled as compared to the case of using a phenolic compound having a structure in which three or more hydroxyl groups are bound to the benzene ring. As a result, the occurrence of gelation tends to be sufficiently prevented. In a case in which the specific divalent phenolic compound is use, handling property tend to be improved since the softening point increases compared to the case of using a phenolic compound having a structure in which three or more hydroxyl groups are bound to the benzene ring (for example, see Japanese Patent Publication (JP-B) No. 5019272).

Examples of the specific divalent phenolic compound include catechol (i.e., 1,2-benzenediol), resorcinol (i.e., 1,3-benzenediol), hydroquinone (i.e., 1,4-benzenediol), and a derivative thereof. Examples of the derivative of the specific divalent phenolic compound include a compound having a structure in which a substituent such as an alkyl group having from 1 to 8 carbon atoms is bound to the benzene ring. The specific divalent phenolic compound may be used singly, or in combination of two or more kinds thereof.

The specific divalent phenolic compound is preferably hydroquinone, from the viewpoint of improving the heat conductivity. Since hydroquinone has a structure in which two hydroxyl groups on the benzene ring are in a para-position relationship, an epoxy resin oligomer obtained by a reaction with an epoxy resin monomer has a linear structure composed of rigid molecules. Therefore, the molecules of the epoxy resin oligomer and the molecules of the epoxy resin monomer are more easily stacked with each other in the resin sheet, whereby a crystal structure is easily formed.

The epoxy resin oligomer is preferably a reaction product of the epoxy resin monomer represented by the Formula (1) with a specific divalent phenolic compound, more preferably a reaction product of 4-{4-(2,3-epoxypropoxy)phenyl}cyclohexyl=4-(2,3-epoxypropoxy)benzoate with the specific divalent phenolic compound, and still more preferably a reaction product of trans-4-{4-(2,3-epoxypropoxy)phenyl}cyclohexyl=4-(2,3-epoxypropoxy)benzoate with the specific divalent phenolic compound. In case in which the resin sheet includes such an epoxy resin oligomer, the moldability can be improved while a favorable heat conductivity after curing is maintained. The mechanism responsible for this will be described below.

Hereinbelow, specific examples of the epoxy resin oligomer which is a reaction product of 4-{4-(2,3-epoxypropoxy)phenyl}cyclohexyl=4-(2,3-epoxypropoxy)benzoate with the specific divalent phenolic compound are described. Among the following specific examples, an epoxy resin oligomer represented by at least one of Formulae (2-1) to (2-3) is preferable, and an epoxy resin oligomer represented by at least one of Formulae (2-a) to (2-c), namely, an epoxy resin oligomer which is a trans isomer of 4-{4-(2,3-epoxypropoxy)phenyl}cyclohexyl=4-(2,3-epoxypropoxy)benzoate, is more preferable. Although dimers of epoxy resin monomers are shown in the following specific examples, the epoxy resin oligomer may be a trimer or higher oligomer.

(2-1)

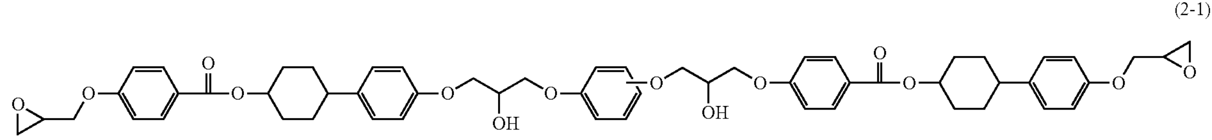

(2-2)

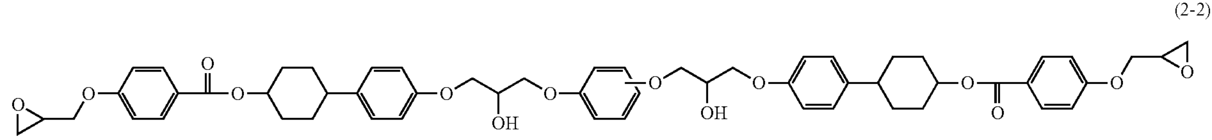

(2-3)

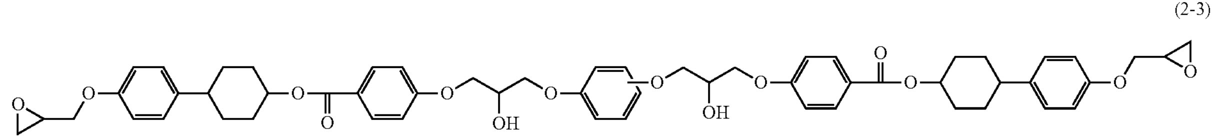

(2-a)

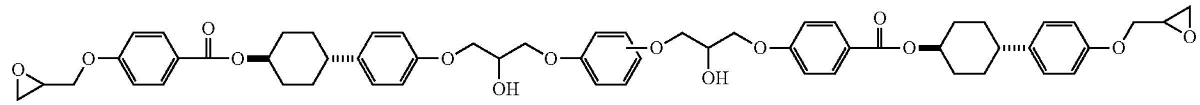

(2-b)

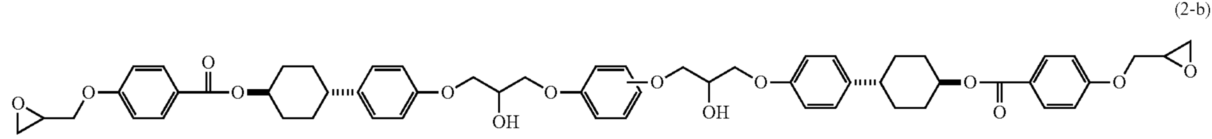

(2-c)

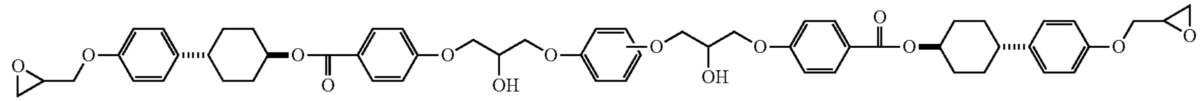

Three isomers different in hydroxyl group positions on the benzene ring derived from the specific divalent phenolic compound are present in respective epoxy resin oligomers represented by Formulae (2-1) to (2-3) and Formulae (2-a) to (2-c). For example, in a case in which the specific divalent phenolic compound is hydroquinone, the epoxy resin oligomers represented by Formulae (2-1) to (2-3) and Formulae (2-a) to (2-c) are represented by the following Formulae (3-1) to (3-3) and the following Formulae (3-a) to (3-c), respectively.

The synthesis solvent is not particularly limited as long as the solvent is capable of being warmed to a temperature necessary for allowing a reaction between the epoxy resin monomer and the specific divalent phenolic compound to proceed. Specific examples of the synthesis solvent include cyclohexanone, cyclopentanone, ethyl lactate, propylene glycol monomethyl ether, and N-methylpyrrolidone. The synthesis solvent may be used singly, or in combination of two or more kinds thereof.

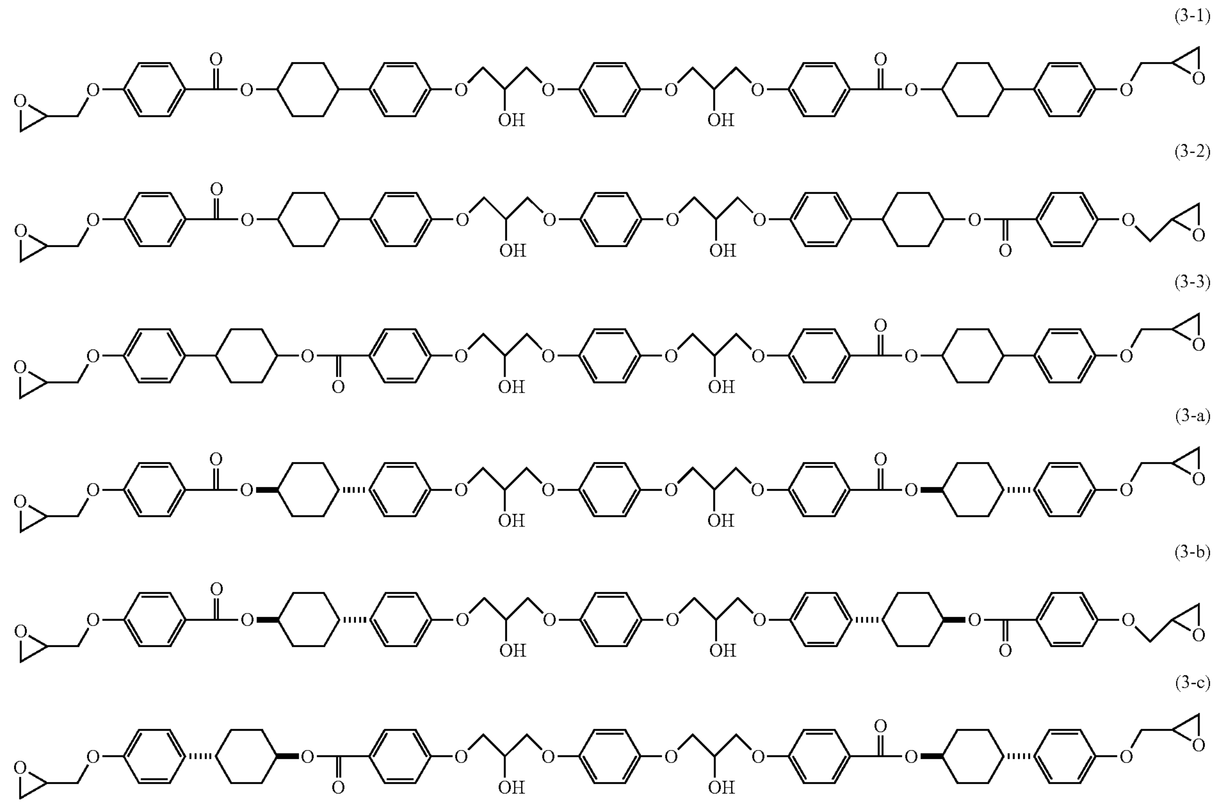

Among the epoxy resin oligomers shown above, an epoxy resin oligomer represented by at least one of Formulae (3-1) to (3-3) is preferable, and an epoxy resin oligomer represented by at least one of Formulae (3-a) to (3-c) is more preferable. The respective epoxy resin oligomers represented by Formulae (3-1) to (3-3) and Formulae (3-a) to (3-c) have a linear structure, and thus have a high molecular stacking characteristics and easily form a higher-order structure, whereby head conductivity tends to be improved.

The method of synthesizing the epoxy resin oligomer is not specifically limited. For example, the epoxy resin oligomer may be synthesized by dissolving the epoxy resin monomer, the specific divalent phenolic compound, and a reaction catalyst in a synthesis solvent, and stirring the mixture with the application of heat. Although the epoxy resin oligomer may also be synthesized by melting and reacting the epoxy resin monomer without any solvent, the epoxy resin monomer is needed to be heated to a high temperature at which the epoxy resin monomer is molten, which makes the reaction difficult to be regulated. Therefore, a synthesis method using a synthesis solvent is preferable in terms of safety.

The amount of the synthesis solvent is not particularly limited as long as it is an amount which enables all the epoxy resin monomer, the specific divalent phenolic compound, and the curing catalyst to be dissolved at the reaction temperature. A concentration of the solid content to be charged may be from 20% by mass to 60% by mass because a favorable viscosity range of a resin solution after synthesis is achieved, while the solubility may vary depending on the types of raw materials before the reaction, the type of the solvent, and the like.

The type of the reaction catalyst is not particularly limited, and an appropriate catalyst may be selected in terms of the reaction speed, the reaction temperature, the storage stability, or the like. Specific examples of the reaction catalyst include an imidazole compound, an organic phosphorus compound, a tertiary amine, and a quaternary ammonium salt. The reaction catalyst may be used singly, or in combination of two or more kinds thereof. Among them, at least one selected from the group consisting of: an organic phosphine compound; a compound having intramolecular polarization, obtained by addition of a compound having a π bond, such as maleic anhydride, a quinone compound (such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenolic resin, to an organic phosphine compound; and a complex of an organic phosphine compound and an organic boron compound (such as tetraphenyl borate, tetra-p-tolyl borate, or tetra-n-butyl borate) is preferable from the viewpoint of heat resistance.

In terms of reaction speed and heat conductivity, the reaction catalyst is preferably an organic phosphine compound. Specific examples of the organic phosphine compound include triphenyl phosphine, diphenyl(p-tolyl)phosphine, tris(alkylphenyl)phosphine, tris(alkoxyphenyl) phosphine, tris(alkylalkoxyphenyl)phosphine, tris (dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkyl phosphine, dialkyl aryl phosphine, and alkyl diaryl phosphine.

The amount of the reaction catalyst is not particularly limited. The amount is preferably from 0.1% by mass to 3% by mass, and more preferably from 0.2% by mass to 2% by mass, with respect to the total mass of the epoxy resin monomer and the specific divalent phenolic compound from the viewpoint of reaction speed and storage stability.

The container for use in the synthesis of the epoxy resin oligomer is not specifically limited, and for example, a glass flask or a stainless synthesis tank may be used. A specific synthesis method is as follows, for example. First, the epoxy resin monomer is charged into a flask or a synthesis tank, a synthesis solvent is put therein, and the resultant is heated to a reaction temperature using an oil bath or a heat medium, thereby melting the epoxy resin monomer. Then, the specific divalent phenolic compound is charged thereto and confirmed to be uniformly molten in the synthesis solvent, thereafter the curing catalyst is charged to start the reaction. The reaction solution is taken out after a lapse of a predetermined time, thereby obtaining a solution containing an epoxy resin oligomer. Alternatively, the synthesis solvent is distilled off under the heating condition and under reduced pressure in the flask or the synthesis tank, whereby an epoxy resin oligomer is obtained as a solid.

The reaction temperature is not limited as long as the reaction between an epoxy group and a phenolic hydroxyl group progresses in the presence of the reaction catalyst. The reaction temperature is, for example, preferably in a range from 100° C. to 180° C., and more preferably in a range from 120° C. to 170° C. In a case in which the reaction temperature is set at 100° C. or more, the period until the reaction is completed tends to be more shortened. In a case in which the reaction temperature is set at 180° C. or less, the occurrence of gelation tends to be reduced.

The equivalent ratio of the epoxy resin monomer and the specific divalent phenolic compound in the synthesis of the epoxy resin is not specifically limited. For example, the ratio (Ep/Ph) of the number of equivalents (Ep) of the epoxy group in the epoxy resin monomer to the number of equivalents (Ph) of the phenolic hydroxyl group in the specific divalent phenolic compound is preferably in a range of from 100/5 to 100/50. In a case in which the ratio (Ep/Ph) is 100/5 or more, the resulting epoxy resin tends to have a lower softening temperature and a higher fluidity. In a case in which the ratio (Ep/Ph) is 100/50 or less, the crosslinking point density tends to be suppressed from being decreased, and heat resistance and heat conductivity tend to be increased.

(2) Epoxy Resin Monomer

The resin sheet according to an embodiment of the present invention contains an epoxy resin monomer. Since the resin sheet according to an embodiment of the present invention contains both the epoxy resin oligomer and an epoxy resin monomer as the epoxy resin, moldability is improved as compared to a case in which only the epoxy resin oligomer is contained as the epoxy resin. The epoxy resin monomer may be used singly, or in combination of two or more kinds thereof.

The epoxy resin monomer contained in the resin sheet may be the same as, or different from, the epoxy resin monomer as a component of the epoxy resin oligomer contained in the resin sheet. Further, the epoxy resin monomer may be an unreacted epoxy resin monomer contained in a solution or a solid obtained during the synthesis of the epoxy resin oligomer.

The structure of the epoxy resin monomer is not particularly limited. For example, an epoxy resin monomer to be used may be selected from those described above as specific examples of the epoxy resin monomer as a component of the epoxy resin oligomer. In view of heat conductivity, the epoxy resin monomer is preferably an epoxy resin monomer having a mesogen skeleton. Specific examples of the epoxy resin monomer having a mesogen skeleton include those described above as examples of the epoxy resin monomer having a mesogen skeleton which is a component of the epoxy resin oligomer. The epoxy resin monomer having a mesogen skeleton may be used singly, or in combination of two or more kinds thereof.

The epoxy resin monomer may be an epoxy resin monomer other than the epoxy resin monomer having a mesogen skeleton. Examples of such an epoxy resin monomer include glycidyl ethers of phenolic compounds such as glycidyl ethers of bisphenol A, bisphenol F, bisphenol S, phenol novolac, cresol novolac, or resorcinol novolac; glycidyl ethers of alcohol compounds such as glycidyl ethers of butanediol, polyethylene glycol, or polypropylene glycol; glycidyl esters of carboxylic acid compounds such as glycidyl ethers of phthalic acid, isophthalic acid, or tetrahydrophthalic acid; glycidyl-type (including methyl glycidyl-type) epoxy resin monomers such as those obtained by substituting an active hydrogen bound to a nitrogen atom of aniline or isocyanuric acid with a glycidyl group; alicyclic epoxy resin monomers, such as vinylcyclohexene epoxide, 3,4-epoxycyclohexylmethyl-3,4-epoxycyclohexane carboxylate, or 2-(3,4-epoxy)cyclohexyl-5,5-spiro(3,4-epoxy) cyclohexane-m-dioxane, obtained by epoxidizing an olefin bond in the molecule; epoxidized products of bis(4-hydroxy) thioether; glycidyl ethers of para-xylylene-modified phenolic resins, metaxylylene paraxylylene-modified phenolic resins, terpene-modified phenolic resins, dicyclopentadiene-modified phenolic resins, cyclopentadiene-modified phenolic resins, polycyclic aromatic-ring-modified phenolic resins, and naphthalene-ring-containing phenolic resins; stilbene type epoxy resin monomers; and halogenated phenol novolac type epoxy resin monomers (among them, the epoxy resin monomers having a mesogen skeleton are excluded). The epoxy resin monomer other than the epoxy resin monomer having a mesogen skeleton may be used singly, or in combination of two or more kinds thereof.

Inorganic Filler

The resin sheet according to an embodiment contains an inorganic filler. The resin sheet containing an inorganic filler can achieve a high heat conductivity and high insulation properties. The type of the inorganic filler is not specifically limited. Specific examples thereof include boron nitride, alumina, aluminum nitride, silica, mica, magnesium oxide, silicon nitride, aluminum hydroxide, and barium sulfate. It is preferable to contain at least one selected from the group consisting of boron nitride, alumina, and aluminum nitride from the viewpoints of heat conductivity and electric insulation properties.

In particular, in a case in which the resin sheet contains a boron nitride filler, heat conductivity is dramatically improved. The reason for this can be presumed, for example, as follows. Boron nitride has a Mohs' hardness of 2, which is lower as compared to that of another insulating ceramic such as alumina or aluminum nitride (having a hardness of 8, for example), and thus is soft. Further, since spherical or round shaped boron nitride is in a state in which primary particles thereof are aggregated, voids are formed between the particles. Therefore, although the boron nitride particles are harder than the resin contained in the resin sheet, the boron nitride particles themselves are easily deformed. As a result, the resin sheet can be easily deformed by the application of an external force, and can be deformed in a case in which a pressing step described below is carried out. During the deformation, the resin between filler can be excluded. Therefore, the particles of the filler can easily come closer to each other, and the formation of a structure, in which the filler particles containing boron nitride and having a large particle size are successively in contact with each other within the resin sheet, can be suppressed, whereby heat conductivity is improved.

To confirm whether the resin sheet contains boron nitride or not, it is effective to use a technique of directly observing the texture of the resin sheet under a microscope. For example, the form of crystals of the filler in the resin sheet can be confirmed by observing a cross section of the resin sheet using an SEM (scanning electron microscope). Further, the elements of the filler can be qualitatively analyzed using an SEM-EDX (energy dispersive X-ray spectrometer).

In a case in which the inorganic filler has a particle size distribution, an average particle diameter (D50) corresponding to a particle diameter at 50% accumulation from the smallest particle diameter of the inorganic filler when the weight cumulative particle diameter distribution curve is drawn on a vertical axis, with the particle diameter plotted on a horizontal axis, is preferably from 20 μm to 120 μm, and more preferably from 25 μm to 115 μm, from the viewpoint of heat conductivity. In a case in which the inorganic filler has plural peaks in the particle size distribution curve, for example, a combination of two or more kinds of inorganic fillers having different average particle diameters with each other may be used.

The average particle diameter (D50) of the inorganic filler herein corresponds to the particle diameter at 50% weight-accumulated from the smaller particle diameter in the weight accumulation particle size distribution depicted in measurement with a laser diffraction method. The particle size distribution measurement by a laser diffraction method may be carried out using a laser diffraction particle size analyzer (for example, LS230 manufactured by Beckman Coulter, Inc.).

The content of an inorganic filler in the resin sheet is more than 30% by volume but less than 80% by volume with respect to the total volume of the resin sheet being 100% by volume. The content of an inorganic filler is preferably more than 30% by volume but less than 75% by volume, more preferably from 40% by volume to 70% by volume, with respect to the total volume of the resin sheet being 100% by volume, from the viewpoints of heat conductivity and moldability. In a case in which the content of an inorganic filler is more than 30% by volume, heat conductivity tends to be improved. In a case in which the content of an inorganic filler is less than 80% by volume or less, moldability tends to be improved.

The content (% by volume) of an inorganic filler in the resin sheet herein is the value determined from the following expression.

$$\text{Content (\% by volume) of inorganic filler}=\{(Ew/Ed)/((Aw/Ad)+(Bw/Bd)+(Cw/Cd)+(Dw/Dd)+(Ew/Ed)+(Fw/Fd))\}\times 100$$

The respective variables are as follows.

Aw: Mass composition ratio (% by mass) of epoxy resin

Bw: Mass composition ratio (% by mass) of curing agent

Cw: Mass composition ratio (% by mass) of silane coupling agent (optional component)

Dw: Mass composition ratio (% by mass) of curing accelerator (optional component)

Ew: Mass composition ratio (% by mass) of inorganic filler

Fw: Mass composition ratio (% by mass) of other component(s) (optional component)

Ad: Specific gravity of epoxy resin

Bd: Specific gravity of curing agent

Cd: Specific gravity of silane coupling agent (optional component)

Dd: Specific gravity of curing accelerator (optional component)

Ed: Specific gravity of inorganic filler

Fd: Specific gravity of other component(s) (optional component)

Curing Agent

The resin sheet according to an embodiment may contain a curing agent. The curing agent is not particular limited as long as it can react with an epoxy resin oligomer and an epoxy resin monomer contained in the resin sheet. From the viewpoint of improving heat resistance, a phenolic curing agent is preferable. Examples of the phenolic curing agent include a trifunctional compound such as 1,2,4-trihydroxybenzene or 1,3,5-trihydroxybenzene. A novolac-type phenol novolac resin obtained by linking such a low-molecular weight phenolic compound with a methylene chain or the like may also be used as the curing agent.

In terms of heat conductivity, the curing agent preferably contains a phenol novolac resin. Specifically, the curing agent preferably contains a phenol novolac resin (dihydroxybenzene novolac resin) obtained by linking a bifunctional phenolic compound such as catechol, resorcinol, or hydroquinone with a methylene chain.

The dihydroxybenzene novolac resin may be a novolac resin of one phenolic compound, such as a catechol novolac resin, a resorcinol novolac resin, or a hydroquinone novolac resin; or a novolac resin of two or more phenolic compounds, such as a catechol-resorcinol novolac resin or a resorcinol-hydroquinone novolac resin. In particular, a compound having a structural unit (structural unit derived from resorcinol) represented by the following Formula (4).

(4)

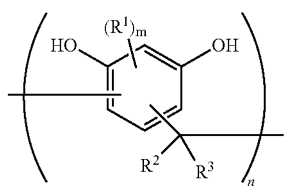

In Formula (4), $R^1$ represents an alkyl group, an aryl group, or an aralkyl group. Each of $R^2$ and $R^3$ independently represents a hydrogen atom, an alkyl group, an aryl group, or an aralkyl group. Each m independently represents an integer from 0 to 2, and each n independently represents an integer from 1 to 7. When m represents 2, two $R^1$'s may be the same as or different from each other.

The compound having the structural unit represented by Formula (4) may further include a structure derived from a phenolic compound other than resorcinol. Examples of the phenolic compound other than resorcinol include phenol, cresol, catechol, hydroquinone, 1,2,3-trihydroxybenzene, 1,2,4-trihydroxybenzene, and 1,3,5-trihydroxybenzene. The structure derived from a phenolic compound other than resorcinol may be included singly, or in combinations of two or more kinds thereof.

The partial structure derived from a phenolic compound as used herein means a monovalent or divalent group formed by removing one or two hydrogen atoms from the benzene ring moiety of a phenolic compound. The position at which a hydrogen atom is removed is not particularly limited.

The partial structure derived from a phenolic compound other than resorcinol in the compound having the structural unit represented by Formula (4) is preferably a partial structure derived from at least one selected from the group consisting of phenol, cresol, catechol, hydroquinone, 1,2,3-trihydroxybenzene, 1,2,4-trihydroxybenzene, and 1,3,5-trihydroxybenzene, and more preferably a partial structure derived from at least one selected from the group consisting of catechol and hydroquinone, from the viewpoints of heat conductivity and adhesiveness.

The content of the partial structure derived from resorcinol in the compound having the structural unit represented by Formula (4) is not particularly limited. The content of the partial structure derived from resorcinol with respect to the total mass of the compound having the structural unit represented by Formula (4) is preferably 55% by mass or more from the viewpoint of elastic modulus. The content of the partial structure derived from resorcinol with respect to the total mass of the compound having the structural unit represented by Formula (4) is more preferably 60% by mass or more, and still more preferably 80% by mass or more, from the viewpoints of the glass transition temperature (Tg) and the linear expansion coefficient of a cured product, and is particularly preferably 90% by mass or more from the viewpoint of heat conductivity.

The molecular weight of the compound having a structural unit represented by Formula (4) is not particularly limited. The number average molecular weight (Mn) thereof is preferably 2,000 or less, more preferably 1,500 or less, and still more preferably from 350 to 1,500, from the viewpoint of fluidity. The weight average molecular weight (Mw) is preferably 2,000 or less, more preferably 1,500 or less, and still more preferably from 400 to 1,500. The Mn and Mw are measured by a common method using gel permeation chromatography (GPC).

The hydroxyl equivalent of the compound having a structure represented by Formula (4) is not particularly limited. An average of the hydroxyl equivalent is preferably from 55 g/eq to 200 g/eq, more preferably from 62 g/eq to 190 g/eq, and still more preferably from 65 g/eq to 180 g/eq, from the viewpoint of crosslinking density involved in heat resistance.

The curing agent may include both a phenol novolac resin and an unreacted phenolic compound that forms the phenol novolac resin (hereinafter, also referred to as "monomer"). The content (hereinafter, also referred to as "monomer content") of the monomer with respect to the total mass of the phenol novolac resin and the phenolic compound is not particularly limited. The monomer content is preferably from 5% by mass to 80% by mass, more preferably from 15% by mass to 60% by mass, and still more preferably from 20% by mass to 50% by mass, from the viewpoints of heat conductivity and moldability. In a case in which the monomer content is 80% by mass or less, the amount of a monomer not contributing to crosslinking in a curing reaction is decreased, and the amount of cronsslinkable, high-molecular-weight product is increased, whereby a higher-order structure having a higher density is formed, and heat conductivity tends to be improved. In a case in which the monomer content is 5% by mass or more, flowing during molding easily occurs and adhesiveness with the inorganic filler is more enhanced, whereby more superior heat conductivity and heat resistance tends to be attained.

The content of the curing agent in the resin sheet is not particularly limited. In a case in which the resin sheet according to an embodiment contains a phenol curing agent, the content of the phenol curing agent in the resin sheet is a content in which the ratio (the number of equivalents of the phenolic hydroxyl group/the number of equivalents of the epoxy group) of the number of equivalents of active hydrogen of the phenolic hydroxyl group in the phenol curing agent (the number of equivalents of the phenolic hydroxyl group) and the number of equivalents of the epoxy group in the epoxy resin oligomer and the epoxy resin monomer contained in the resin sheet is preferably from 0.5 to 2, and more preferably from 0.8 to 1.2.

Curing Accelerator

The resin sheet according to an embodiment of the present invention may contain a curing accelerator. The type of the curing accelerator is not particularly limited, and may be appropriately selected from the viewpoint of reaction speed, reaction temperature, storage properties, or the like. Specific examples of the curing accelerator include compounds described above as examples of the reaction catalyst which can be used for the synthesis of the epoxy resin oligomer.

In a case in which the resin sheet contains a curing accelerator, the content of the curing accelerator is not particularly limited. The content of the curing accelerator with respect to the total mass of the epoxy resin oligomer, the epoxy resin monomer, and the curing agent is preferably from 0.1% by mass to 1.5% by mass, and more preferably from 0.2% by mass to 1% by mass, from the viewpoints of fluidity and moldability.

Silane Coupling Agent

The resin sheet according to an embodiment may contain a silane coupling agent. In a case in which the resin sheet contains a silane coupling agent, the surface of the inorganic filler and an epoxy resin surrounding the inorganic filler interact with each other, whereby fluidity and heat conductivity tend to be improved, and ingress of water into the resin sheet tends to be suppressed and insulation reliability tends to be thus improved.

The type of the silane coupling agent is not particularly limited, and a commercially available silane coupling agent may be used. Specific examples thereof include 3-phenylaminopropyltrimethoxysilane, 3-phenylaminopropyltriethoxysilane, N-methyl anilinopropyltrimethoxysilane, N-methylanilinopropyltriethoxysilane, 3-phenyliminopropyltrimethoxysilane, 3-phenyliminopropyltriethoxysilane, phenyltrimethoxysilane, phenyltriethoxysilane, diphenyldimethoxysilane, diphenyldiethoxysilane, triphenylmethoxysilane and triphenylethoxysilane. The silane coupling agent may be used singly, or in combination of two or more kinds thereof.

The amount of the silane coupling agent to be used is preferably set so that the coating rate with respect to the total surface area of the inorganic filler (hereinafter, designated as the "coating rate of the silane coupling agent") is from 0.4 to 4.0. The coating rate of the silane coupling agent is calculated from the following expression.

Coating rate of silane coupling agent={Minimum coating area ($m^2$/g) of silane coupling agent×Amount (g) of silane coupling agent to be used}/{Specific surface area ($m^2$/g) of inorganic filler×Amount (g) of inorganic filler to be used}

The minimum coating area of the silane coupling agent in the above expression is calculated from the following expression.

Minimum coating area ($m^2$/g) of silane coupling agent={Avogadro constant ($6.02\times10^{23}$)($mol^{-1}$)×Coating area ($13\times10^{-20}$)($m^2$) per molecule of silane coupling agent}/Molecular weight (g/mol) of silane coupling agent The coating rate of the silane coupling agent, determined by the above expression, is 1 in a case in which the entire surface of the inorganic filler is coated with the silane coupling agent. In such a case, the unreacted silane coupling agent which does not react with the inorganic filler may be generated because a polar group such as a hydroxyl group is not present, in some cases, on the surface of the inorganic filler in such an amount as to react with the silane coupling agent. Therefore, in a case in which the coating rate of the silane coupling agent is 4.0 or less, a silane coupling agent that does not react with the inorganic filler may inhibit binding of the inorganic filler and the epoxy resin, or intermolecular crosslinking of the epoxy resin, thereby inhibiting a decrease in heat conductivity. In a case in which the coating rate of the silane coupling agent is 0.4 or more, molding failure such as the occurrence of voids tends to be suppressed. Accordingly, the coating rate of the silane coupling agent is preferably from 0.4 to 4.0, and more preferably from 0.5 to 3.0.

The method of adding the silane coupling agent to the resin sheet is not particularly limited. Examples thereof include an integral method in which a silane coupling agent is added during mixing of other materials such as the epoxy resin and the inorganic filler; a master batch method in which a predetermined amount of the silane coupling agent is mixed with a small amount of the epoxy resin, and thereafter the resulting mixture is mixed with other materials such as the inorganic filler; and a pretreatment method in which the silane coupling agent is mixed with the inorganic filler in advance, to treat the surface of the inorganic filler, and thereafter the resultant is mixed with other materials such as the epoxy resin. The pretreatment method is classified into: a dry method in which an undiluted solution or a solution of the silane coupling agent is stirred together with the inorganic filler at a high speed, thereby providing uniform dispersion; and a wet method in which the surface of the inorganic filler is treated by forming a diluted solution of the silane coupling agent into a slurry or directly immersing the inorganic filler in the diluted solution.

Other Components

The resin sheet according to an embodiment of the present invention may contain a stress relieving material, a reinforcing material, and/or the like, if necessary. Examples of the stress relieving material include rubber powder (such as butyl rubber powder, neoprene rubber powder, nitrile rubber (NBR) powder, or silicone rubber powder). Examples of the reinforcing material include inorganic fibers such as glass fiber or carbon fiber.

Method of Producing Resin Sheet

The method of producing the resin sheet according to an embodiment of the present invention is not particularly limited. Examples of general production methods include a method in which predetermined blending amounts of components are sufficiently mixed using a mixer or the like, the mixture is then melt-kneaded using a mixing roller, an extruder, or the like, followed by cooling and pulverizing to form pellets. The obtained pellets are charged into a mold or the like and then subjected to press molding, or alternatively, charged into a biaxial molding machine to be subjected to extrusion molding, and if necessary, the resulting sheet is stretched to adjust the thickness thereof.

The pellets can be produced, for example, by sufficiently stirring and mixing predetermined amounts of components, kneading the mixture using a kneader, a roll, an extruder, or the like heated to a temperature of from 60° C. to 120° C. in advance, followed by cooling and pulverizing.

The pellets may be formed into tablets in a size and mass suitable for molding conditions, for example, and the resulting tablets may be subjected to compression molding or transfer molding, thereby forming a sheet in a semi-cured state.

The resin sheet may be formed on a substrate in order to improve handling property. Further, a substrate may be disposed on the resin sheet in order to protect the surface of the resin sheet. The type of the substrate is not particularly limited, and examples thereof include a polyethylene terephthalate (PET) film, an aluminum foil, and a copper foil. The thickness of the substrate is not particularly limited, and may be, for example, from 9 μm to 300 μm.

The thickness (average thickness) of the resin sheet to be formed on the substrate is not particularly limited, and may be appropriately selected depending on the purpose. For example, the thickness of the resin sheet may be from 0.2 mm to 3.0 mm, and preferably from 0.3 mm to 2.5 mm.

The resin sheet according to an embodiment of the present invention is preferably prepared without any solvent or with a low amount of solvent. By preparing the resin sheet without any solvent or with a low amount of solvent, the thickness of a single layer of the resin sheet can be increased. In a case in which the resin sheet is formed into a single layer, the generation of voids at the interface of layered resin sheets, formation of thin resin layers due to the adhesion of the resin sheets to each other, and the occurrence of orientation or deformation of a relatively soft filler, such as boron nitride, along the interface may be avoided. As a result, the resin sheet formed into a single layer tends to have more excellent properties, such as a higher heat conductivity, as compared to the resin sheet obtained by layering plural resin sheets.

The resin sheet according to an embodiment of the present invention can be used, for example, as an adhesive sheet. In a common usage method of the resin sheet as an adhesive sheet, for example, a resin sheet formed on a substrate is adhered onto an object to be adhered, and the substrate is then removed.

<Cured Product of Resin Sheet>

A cured product of a resin sheet according to an embodiment is a cured product of the above-described resin sheet.

The method of curing the resin sheet is not particularly limited. For example, a cured product can be obtained by conducting a heat treatment at a temperature of from 100° C. to 250° C. for a period of from 0.5 hours to 10 hours, and preferably at a temperature of from 130° C. to 230° C. for a period of from 1 hour to 8 hours.

The resin sheet may also be cured by a transfer molding method, a compression molding method, or the like. In a case of transfer molding method, a cured product can be obtained by conducting a heat treatment at a mold temperature of from 140° C. to 180° C. and a molding pressure of from 10 MPa to 25 MPa for a period of from 30 seconds to 600 seconds. If necessary, the cured product, released from the mold, may be post-cured by further heating it at a temperature of from 140° C. to 230° C. for a period of from 1 hour to 8 hours.

The method of curing the resin sheet preferably includes a heating and pressurizing treatment. For example, the cured product may be obtained by heating the resin sheet at a temperature of from 100° C. to 250° C. for a period of from 1 hour to 10 hours under a pressure of from 1 MPa to 20 MPa, and preferably at a temperature of from 130° C. to 230° C. for a period of from 1 hour to 8 hours under a pressure of from 1 MPa to 15 MPa. If necessary, the cured product may be post-cured by further heating it at a temperature of from 160° C. to 230° C. for a period of from 1 hour to 8 hours after the pressurizing and curing treatment.

The cured product according to an embodiment preferably has a diffraction peak in a diffraction angle 2θ range of from 3.0° to 3.5° by an X-ray diffraction method using CuKα radiation. A cured product having such a diffraction peak has a higher-order structure (smectic phase) of the resin, and is excellent in heat conductivity.

The detail of the X-ray diffraction measurement using CuKα radiation as used herein is as follows.

[Measurement Conditions]

Apparatus used: X-ray diffractometer for thin film structure evaluation, ATX-G (manufactured by Rigaku Corporation)

Type of X-ray: CuKα

Scanning mode: 2θ/ω

Output: 50 kV, 300 mA

S1 slit: width: 0.2 mm, height: 10 mm

S2 slit: width: 0.2 mm, height: 10 mm

RS slit: width: 0.2 mm, height: 10 mm

Measurement range: 2θ=2.0° to 4.5°

Sampling width: 0.01°

EXAMPLES

Hereinafter, the invention is described in detail with reference to Examples, but the invention is not intended to be limited to these Examples. Unless otherwise specified, "part(s)" and "%" are on the mass basis.

Materials Used for Synthesis of Reaction Product of Epoxy Resin

Epoxy Resin Monomer as Raw Material

Trans-4-{4-(2,3-epoxypropoxy)phenyl}cyclohexyl=4-(2,3-epoxypropoxy)benzoate (manufactured by Sumitomo Chemical Co., Ltd., and having the following structure, see JP-B No. 5471975, epoxy equivalent: 212 g/eq)

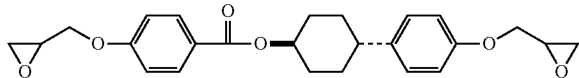

Specific Divalent Phenolic Compound as Raw Material

Hydroquinone (hydroxyl equivalent: 55 g/eq, manufactured by Wako Pure Chemical Industries, Ltd.)

Synthesis Solvent

Cyclohexanone (boiling point: 156° C., manufactured by Wako Pure Chemical Industries, Ltd.)

Reaction Catalyst

Triphenyl phosphine (molecular weight: 262, manufactured by Hokko Chemical Industry)

Synthesis of Reaction Product 1 of Epoxy Resin

The epoxy resin monomer and the specific divalent phenolic compound were reacted at a ratio (Ep/Ph), which is the ratio of the number of equivalent (Ep) of the epoxy group in the epoxy resin monomer to the number of equivalent (Ph) of the phenolic hydroxyl group in the specific divalent phenolic compound, of 100:7, to obtain reaction product 1 of the epoxy resin.

Specifically, 50 g (0.118 mol) of the epoxy resin monomer as a raw material was weighed and loaded into a 500 mL three-necked flask, and 80 g of the synthesis solvent was added thereto. The three-necked flask was equipped with a condenser tube and a nitrogen-introducing tube, and a stirring blade was attached thereto so as to be immersed in the solvent. The three-necked flask was then immersed in an oil bath at 160° C., and stirring was initiated. After confirming that the raw material epoxy resin monomer was dissolved and a transparent solution was obtained, several minutes later, 0.91 g (0.0083 mol) of the specific divalent phenolic compound was added to the flask. Then 0.5 g of the reaction catalyst was further added thereto, and the flask was heated at an oil bath temperature of 160° C. The heating was continued for five hours, and then the synthesis solvent was removed from the reaction solution by distillation under reduced pressure. Thereafter, the residue was cooled to room temperature to obtain reaction product 1 of the epoxy resin. The thus obtained reaction product 1 of the epoxy resin contains an epoxy resin oligomer generated by the reaction, unreacted epoxy resin monomer, and a portion of the synthesis solvent.

The number average molecular weight of reaction product 1 of the epoxy resin was measured by gel permeation chromatography (GPC), and it was confirmed that the number average molecular weight of the oligomer component newly generated by the synthesis was 1,210 g/mol, and the number average molecular weight of the total of the unreacted epoxy resin monomer and the epoxy resin oligomer was 494 g/mol. Further, the epoxy equivalent of reaction product 1 of the epoxy resin was measured by perchloric acid titration, to be 241 g/eq.

Reaction product 1 of the epoxy resin was analyzed by gel permeation chromatography (GPC) in terms of area ratio, and it was confirmed that the reaction product contains a compound represented by at least one of Formulae (3-a) to (3-c). The total content of the compound represented by at least one of Formulae (3-a) to (3-c) was 8.7% by mass with respect to the total amount of reaction product 1 of the epoxy resin (excluding the synthesis solvent).

Synthesis of Reaction Product 2 of Epoxy Resin

The epoxy resin monomer and the specific divalent phenolic compound were reacted at a ratio (Ep/Ph), which is the ratio of the number of equivalent (Ep) of the epoxy group in the epoxy resin monomer to the number of equivalent (Ph) of the phenolic hydroxyl group in the specific divalent phenolic compound, of 100:15, to obtain reaction product 2 of the epoxy resin.

Specifically, reaction product 2 of the epoxy resin was obtained in the same manner as in Example 1, except that the specific divalent phenolic compound was added in an amount of 1.95 g (0.0176 mol).

The number average molecular weight of reaction product 2 of the epoxy resin was measured by gel permeation chromatography (GPC), and it was confirmed that the number average molecular weight of the oligomer component newly generated by the synthesis was 1,520 g/mol, and the number average molecular weight of the portion of the reaction product including the unreacted epoxy resin monomer was 583 g/mol. The epoxy equivalent of reaction product 2 of the epoxy resin was measured by perchloric acid titration, to be 263 g/eq.

Reaction product 2 of the epoxy resin was analyzed by gel permeation chromatography (GPC) in terms of area ratio, and it was confirmed that the reaction product contains a compound represented by at least one of Formulae (3-a) to (3-c). The total content of the compound represented by at least one of Formulae (3-a) to (3-c) was 18.2% by mass with respect to the total amount of reaction product 2 of the epoxy resin (excluding the synthesis solvent).

Example 1 to Example 5

For each of the Examples, the materials shown in Table 1 were premixed in a beaker at the blending ratio (parts by mass) shown in Table 1, and the resulting mixture was kneaded by a kneader under the conditions of a kneading temperature of from 60° C. to 90° C. and a kneading time of 2 minutes, followed by cooling and pulverizing, to obtain pellets of a resin composition of each Example. Subsequently, the pellets of each Example were spread in a mold having a size of 50 mm×50 mm, and molded under the conditions of a pressing temperature of 120° C., a molding pressure of 15 MPa, and a pressing time of 2 minutes, to produce a resin sheet (B-stage sheet) in a semi-cured state. Each resulting resin sheet was sandwiched between two pieces of PET sheets each having a thickness of 35 μm, and cured under the conditions of a pressing temperature of 180° C., a molding pressure of 8 MPa, and a pressing time of 120 minutes.

Here, the resin sheets of Example 1 to Example 3 were formed using a mold having a height of 500 the resin sheet of Example 4 was formed using a mold having a height of 200 μm, and the resin sheet of Example 5 was formed using a mold having a height of 2,000 μm.

Comparative Example 1 and Comparative Examples 3 to 7

For each of the Comparative Examples, the materials shown in Table 1 were premixed in a beaker at the blending ratio (parts by mass) shown in Table 1, and the resulting mixture was kneaded by a kneader under the conditions of a kneading temperature of from 60° C. to 90° C. and a kneading time of 2 minutes, followed by cooling and pulverizing, to obtain pellets of a resin composition of each Comparative Example. Subsequently, the pellets of each Comparative Example were spread in a mold having a size of 50 mm×50 mm, and molded under the conditions of a pressing temperature of 120° C., a molding pressure of 15 MPa, and a pressing time of 2 minutes, to produce a resin sheet (B-stage sheet) in a semi-cured state. Each resulting resin sheet was sandwiched between two pieces of PET sheets each having a thickness of 35 μm, and cured under the conditions of a pressing temperature of 180° C., a molding pressure of 8 MPa, and a pressing time of 120 minutes.

Here, the resin sheets of Comparative Examples 1, 3, 6, and 7 were formed using a mold having a height of height of 500 μm, the resin sheet of Comparative Example 4 was formed using a mold having a height of 100 μm, and the resin sheet of Comparative Example 5 was formed using a mold having a height of 4,000 μm.

Comparative Example 2

The materials shown in Table 1 were premixed in a polyethylene bottle at the blending ratio (parts by mass) shown in Table 1, and then mixed using a planetary centrifugal mixer (model number: ARE-500, manufactured by Thinky Corporation) at a revolutional speed of 1,000 revolutions/min (rpm) for 5 minutes, to obtain a coating liquid for forming a resin sheet.

A PET film of which one surface had been subjected to a release treatment was used as a substrate. The coating liquid for forming a resin sheet was applied onto the release-treated surface of the PET film using a table coater, so as to achieve a thickness after compression of about 100 μm. Subsequently, the resultant was dried in a box type oven at 100° C. for 5 minutes, to form a laminated body (A-stage sheet) in which an A-stage resin layer formed on the PET film. A plurality of the thus obtained A-stage sheets were layered while removing the substrates other than those which would be the outermost layers, so that five resin layers were disposed one on another. The resultant was subjected to a heating and pressurizing treatment using a heat press machine (hot plate temperature: 120° C., pressure: 15 MPa, treatment time: 10 minutes) so that the resin layers are adhered to each other, thereby obtaining a resin sheet in a semi-cured state (B-stage sheet) having an average thickness of 501 μm.

The PET films were then peeled off from the both surfaces of the obtained B-stage sheet, and the resultant was sandwiched between two pieces of PET sheets each having a thickness of 35 μm, followed by a pressing treatment. The pressing treatment was carried out under the conditions of a hot plate temperature of 150° C., a vacuum degree of 10 kPa or less, a pressure of 15 MPa, and a treatment time of 10 minutes. Further, the resultant was subjected to a heating treatment in a box type oven, at 140° C. for 2 hours, at 165° C. for 2 hours, and then at 190° C. for 2 hours, to obtain a cured resin sheet of Comparative Example 2.

Evaluation

Volatilization Amount in B-stage State

The mass of each of the resin sheets (B-stage sheets) produced in Examples and Comparative Examples was measured, and then the mass thereof after heating at 180° C. for 30 minutes was measured. The mass after the heating was subtracted from the mass before the heating, and the resulting value was divided by the mass before the heating. The percentage of the obtained value was taken as a volatilization amount (% by mass) in B-stage state.

Heat Conductivity

Each of the resin sheets (after curing) produced in Examples and Comparative Examples was cut in a square of 10×10 mm, and subjected to a blackening treatment with graphite spray. Subsequently, the measurement of thermal diffusivity was carried out using a thermal diffusivity measuring apparatus (NANOFLASH, Model LFA 467, manufactured by NETZSCH Inc.). The measurement was carried out under the conditions of a measurement temperature of 25±1° C., a measurement voltage of 270 V, an amplitude of 5,000, and a pulse width of 0.06 ms. The heat conductivity (W/(m·K)) was calculated from the thermal diffusivity as measured above, and from the product of a density as measured by an Archimedes method and a specific heat as measured by a DSC (differential scanning calorimeter). The results are shown in Table 1, along with the measured values of the density.

Dielectric Breakdown Voltage

Each of the resin sheets (after curing) produced in Examples and Comparative Examples was sandwiched between a plate-like electrode having a size of 50×50 mm square and a circular shaped electrode having a diameter of 20 mm, and the measurement of dielectric breakdown voltage was carried out in a fluorine-based inert liquid (FLUORINERT FC-40, manufactured by 3M Company). The measurement was started at a voltage of 4 kV, and the voltage was increased stepwise by 0.5 kV and maintained for 30 seconds at each voltage. The value of the voltage when a current value while maintaining the voltage exceeded 20 mA was taken as the dielectric breakdown voltage (kVrms). The results are shown in Table 1.

Thickness

The thickness of each of the resin sheets (after curing) produced in Examples and Comparative Examples was measured at nine points, using a micrometer (manufactured by Mitutoyo Corporation), and the average thickness (μm) of the measured values was taken as the thickness of each resin sheet. The results are shown in Table 1.

Confirmation of Smectic Structure

The presence or absence of a smectic structure in each resin sheet (after curing) was analyzed by the X-ray diffraction method using CuKα radiation. As a result, each of the cured resin sheets produced in Examples and Comparative Examples had a diffraction peak in a diffraction angle 2θ range of from 3.0° to 3.5°. This confirmed that a smectic structure had been formed.

TABLE 1

| | | | Example 1 | Example 2 | Example 3 | Example 4 | Example 5 |
|---|---|---|---|---|---|---|---|
| Material composition | Epoxy resin | Reaction product 1 | 10.00 | — | 7.99 | 10.00 | 10.00 |
| | | Reaction product 2 | — | 10.00 | — | — | — |
| | | Monomer 1 | — | — | — | — | — |
| | | Monomer 2 | — | — | 2.00 | — | — |
| | | Monomer 3 | — | — | — | — | — |
| | Curing agent | | 2.59 | 2.38 | 2.78 | 2.59 | 2.59 |
| | Silane coupling agent | | 0.04 | 0.04 | 0.04 | 0.04 | 0.04 |
| | Curing accelerator | | 0.01 | 0.01 | 0.01 | 0.01 | 0.01 |
| | Filler | Boron nitride | 38.6 | 38.1 | 39.1 | 38.6 | 38.6 |
| | | Alumina 1 | 3.88 | 3.83 | 3.93 | 3.88 | 3.88 |
| | | Alumina 2 | 3.88 | 3.83 | 3.93 | 3.88 | 3.88 |
| | Solvent | | — | — | — | — | — |
| | Filler content | % by volume | 65 | 65 | 65 | 65 | 65 |
| | Number of layered sheets | sheet | 1 | 1 | 1 | 1 | 1 |
| Evaluation | Appearance of B-stage sheet | | Favorable | Favorable | Favorable | Favorable | Favorable |
| | Amount of volatilization in B-stage state | % by mass | 0.05 | 0.04 | 0.06 | 0.02 | 0.07 |
| | Appearance after curing | | Favorable | Favorable | Favorable | Favorable | Favorable |
| | Heat conductivity | W/(m · K) | 12.2 | 11.8 | 12.5 | 12.1 | 12.6 |
| | Dielectric breakdown voltage | kVrms | 20 or more | 20 or more | 20 or more | 11.5 | 20 or more |
| | Density | g/m$^3$ | 2.03 | 2.02 | 2.01 | 2.00 | 2.02 |
| | Thickness | μm | 513 | 509 | 503 | 209 | 1982 |

| | | | Comparative Example 1 | Comparative Example 2 | Comparative Example 3 | Comparative Example 4 | Comparative Example 5 |
|---|---|---|---|---|---|---|---|
| Material composition | Epoxy resin | Reaction product 1 | — | — | — | 10.00 | 10.00 |
| | | Reaction product 2 | — | — | — | — | — |
| | | Monomer 1 | 10.00 | 10.00 | 7.93 | — | — |
| | | Monomer 2 | — | — | — | — | — |
| | | Monomer 3 | — | — | 1.98 | — | — |

TABLE 1-continued

| | | | | | | | |
|---|---|---|---|---|---|---|---|
| | Curing agent | | 2.83 | 2.83 | 2.97 | 2.59 | 2.59 |
| | Silane coupling agent | | 0.04 | 0.04 | 0.04 | 0.04 | 0.04 |
| | Curing accelerator | | 0.01 | 0.01 | 0.01 | 0.01 | 0.01 |
| | Filler | Boron nitride | 39.3 | 39.3 | 39.4 | 8.9 | 83.1 |
| | | Alumina 1 | 3.95 | 3.95 | 3.96 | 0.895 | 8.353 |
| | | Alumina 2 | 3.95 | 3.95 | 3.96 | 0.895 | 8.353 |
| | Solvent | | — | 38.5 | — | — | — |
| | Filler content | % by volume | 65 | 65 | 65 | 30 | 80 |
| | Number of layered sheets | sheet | 1 | 5 | 1 | 1 | 1 |
| Evaluation | Appearance of B-stage sheet | | Poor (thin spots) | Favorable | Poor (thin spots) | Poor (thin spots) | Poor (thin spots) |
| | Amount of volatilization in B-stage state | % by mass | 0.06 | 0.83 | 0.05 | 0.07 | 0.07 |
| | Appearance after curing | | Poor (thin spots) | Favorable | — | — | — |
| | Heat conductivity | W/(m · K) | 11.5 | 7.8 | — | — | — |
| | Dielectric breakdown voltage | kVrms | 7.5 | 20 or more | — | — | — |
| | Density | g/m$^3$ | 1.98 | 2.02 | 1.95 | 1.37 | 2.06 |
| | Thickness | μm | 472 | 472 | 464 | 423 | 466 |

The details of the respective materials shown in Table 1 are as follows. Note that the "–" in the Table indicates that the corresponding material was not contained, or that the evaluation was not carried out.

Epoxy Resin

Reaction product 1: reaction product 1 of the epoxy resin produced above

Reaction product 2: reaction product 2 if the epoxy resin produced above

Monomer 1: trans-4-{4-(2,3-epoxypropoxy)phenyl}cyclohexyl=4-(2,3-epoxypropoxy)benzoate, manufactured by Sumitomo Chemical Co., Ltd., see JP-B No. 5471975, epoxy equivalent: 212 g/eq Monomer 2: a mixture obtained by mixing a compound represented by the following formula wherein R is a hydrogen atom, and a compound represented by the following formula wherein R is a methyl group, at a mass ratio of about 1:1, YL6121H, manufactured by Mitsubishi Chemical Corporation, epoxy resin equivalent: 171 g/eq

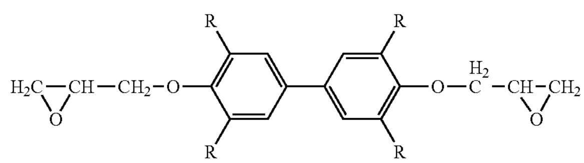

Monomer 3: a bisphenol A/F mixed-type epoxy resin (model number: ZX-1059, manufactured by Nippon Steel & Sumikin Chemical Co., Ltd.

Inorganic Filler

Boron nitride: HP40 MF100, manufactured by Mizushima Ferroalloy Co., Ltd., volume average particle diameter: 42 μm Alumina 1: AX3-32, manufactured by Nippon Steel & Sumikin Materials Co., Ltd., Micron Company, volume average particle diameter: 5 μm Alumina 2: trade name: LS235, manufactured by Nippon Light Metal Company, Ltd., volume average particle diameter: 0.5 μm Curing Agent Phenol novolac resin: A-4SM, manufactured by Hitachi Chemical Co., Ltd.

Curing Accelerator

Triphenylphosphine (TPP): manufactured by Hokko Chemical Industry

Silane Coupling Agent

N-phenyl-3-aminopropylphenyltrimethoxysilane: KBM-573, manufactured by Shin-Etsu Chemical Co., Ltd., molecular weight: 255 g/mol)

Solvent

Cyclohexanone

Discussion of Results

It can be seen from the results shown in Table 1 that, in each of Example 1 to Example 5 in which a reaction product containing an epoxy resin oligomer having a mesogen skeleton was used as the epoxy resin, the resulting B-stage sheet and the sheet after curing had a favorable appearance, and had an excellent moldability without any solvent. Further, favorable results were obtained in the measurement of the heat conductivity and the dielectric breakdown voltage.

In Comparative Example 1 in which an epoxy resin monomer having a mesogen skeleton was used alone as the epoxy resin, the resulting B-stage sheet and the sheet after curing were both evaluated to have a poor appearance (thin spots), and had a dielectric breakdown voltage lower than those of Examples. This is presumably because moldability of the resin sheet of the Comparative Example 1 was poor as compared to that in each of the resin sheets of Examples containing the epoxy resin oligomer having a mesogen skeleton, and as a result, voids remained in the resin sheet.

In Comparative Example 2 in which the epoxy resin monomer having a mesogen skeleton was used alone as the epoxy resin, and in which an organic solvent was used as a dispersion medium for improving the moldability, a favorable dielectric breakdown voltage was obtained. However, the heat conductivity was lower than those of Examples. The favorable dielectric breakdown voltage is presumably due to an improved moldability as a result of using the organic solvent. On the other hand, the low heat conductivity is presumably due to the generation of interfaces between plural resin sheets disposed one on another, as shown in FIG. 2.

In Comparative Example 3 in which the epoxy resin monomer having a mesogen skeleton and a liquid epoxy resin monomer were used as the epoxy resin, the resulting B-stage sheet was evaluated to have a poor appearance (thin spots). This is presumably due to that the addition of the liquid epoxy resin monomer to the epoxy resin monomer having a mesogen skeleton did not produce so much improving effect as compared to the Examples.

In Comparative Example 4 in which the content of the inorganic filler is 30% by volume, the resulting B-stage sheet was evaluated to have a poor appearance (thin spots). This is presumably due to that an excessive amount of resin increases resin flowing during the molding.

In Comparative Example 5 in which the content of the inorganic filler is 80% by volume, the resulting B-stage sheet was evaluated to have a poor appearance (thin spots). This is presumably due to that an excessive amount of inorganic filler decreases resin flowing during the molding.

Based on the above results, it was revealed that the invention provides a resin sheet and a cured product of the resin sheet having an excellent moldability without any solvent or with a low amount of solvent, and an excellent heat conductivity and insulation properties after curing.

The disclosure of Japanese Patent Application No. 2016-034889 is herein incorporated by reference in its entity.

All publications, patent applications, and technical standards mentioned in the specification are herein incorporated by reference to the same extent as if each individual publication, patent application, and technical standard were specifically and individually indicated to be incorporated by reference.

EXPLANATION OF REFERENCE NUMERALS

1: Boron nitride filler, 2: Resin matrix, 3: Resin sheets, 4: Surfaces of the resin sheet, 5: Interface between resin sheets, 10: Alumina filler, 11: Resin matrix, 12: Interface between resin sheets, and 13: Boron nitride filler.

What is claimed is:

1. A resin sheet comprising:

an epoxy resin comprising an epoxy resin oligomer and an epoxy resin monomer, wherein the epoxy resin oligomer has a number average molecular weight of from 600 to 2,300;

a curing agent; and an inorganic filler, wherein a content of the inorganic filler is more than 30% by volume but less than 80% by volume.

2. The resin sheet according to claim 1, wherein the epoxy resin oligomer comprises a reaction product of an epoxy resin monomer having a mesogen skeleton, with a divalent phenolic compound having a structure in which two hydroxyl groups are bound to one benzene ring.

3. The resin sheet according to claim 1, wherein the epoxy resin oligomer comprises a reaction product of a compound represented by the following Formula (1), with a divalent phenolic compound having a structure in which two hydroxyl groups are bound to one benzene ring:

(1)

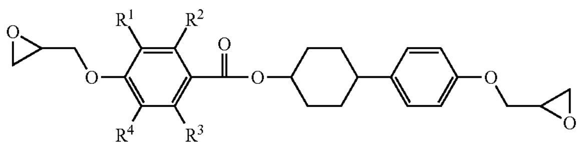

wherein, in Formula (1), each of R1 to R4 independently represents a hydrogen atom or an alkyl group having from 1 to 3 carbon atoms.

4. The resin sheet according to claim 2, wherein the divalent phenolic compound comprises hydroquinone.

5. The resin sheet according to claim 1, wherein the epoxy resin monomer comprises a compound comprising a mesogen skeleton and two epoxy groups in a molecule thereof.

6. The resin sheet according to claim 1, wherein the epoxy resin monomer comprises at least one selected from the group consisting of a compound represented by the following Formula (1) and a biphenyl-type epoxy resin monomer:

(1)

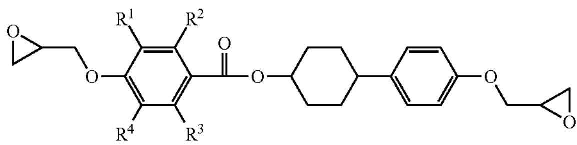

wherein, in Formula (1), each of R1 to R4 independently represents a hydrogen atom or an alkyl group having from 1 to 3 carbon atoms.

7. The resin sheet according to claim 1, wherein the curing agent comprises a dihydroxybenzene novolac resin.

8. The resin sheet according to claim 1, wherein the resin sheet has an average thickness of from 0.2 mm to 3 mm.

9. A cured product of a resin sheet, which is a cured product of the resin sheet according to claim 1.

10. The cured product of the resin sheet according to claim 9, having a diffraction peak in a diffraction angle 2θ range of from 3.0° to 3.5° according to an X-ray diffraction method using CuKα radiation.

* * * * *